United States Patent Office 3,308,073
Patented Mar. 7, 1967

3,308,073
POROUS POLYOLEFIN OBJECTS
James E. Kepple, Bartlesville, Okla., assignor to Phillips Petroleum Company, a corporation of Delaware
No Drawing. Filed Apr. 9, 1962, Ser. No. 185,838
13 Claims. (Cl. 260—2.5)

This invention relates to a solid porous polyolefin material and a method of preparing same. In one aspect the invention relates to a method of filtering.

Porous polymeric materials have found a large and expanding utility for insulation uses, decorative objects, children's playthings and many other industrial commercial applications. Most conventional methods for forming porous or cellular products comprise the use of blowing agents, gases and the like for producing greatly expanded polymeric objects. Other processes incorporate foreign materials such as starch, inorganic solids, plasticizers, and the like into the polymer followed by the removal by extraction or washing. Such techniques produce voids which are generally smaller and such porous objects have utility as "breathable" insulation or filtering mediums.

In my copending application, Serial No. 180,024 filed March 15, 1962, now U.S. Patent No. 3,232,720, I have described a new and useful shaped fuel composition comprising an admixture of a normally liquid hydrocarbon fuel and a normally solid polymer. These shaped fuel compositions find particular utility as briquets useful as auxiliary ignition or combustion aids in charcoal fires or as a means for storing and transporting selected hydrocarbons. It has now been discovered that modifications of this technique make possible the preparation of a porous solid polymer particularly useful as a filtering medium as well as a low density material suitable for toys, floats, insulation and cushioning material and the like.

It is an object of this invention to provide a porous solid polyolefin object.

It is another object of the invention to provide a method for the preparation of a normally solid porous polyolefin material.

It is yet another object of the invention to provide a method of filtering.

These and other aspects, objects and advantages of the invention will be apparent to those skilled in the art upon a study of this disclosure and the appended claims.

Broadly, these objects are accomplished by a novel polymer of an olefin made porous by blending a solid polyolefin and a volatile, normally liquid hydrocarbon at a temperature above the softening point* of the polymer, cooling the resultant mixture below the solidification point of the polymer and thereafter removing substantially all of the normally liquid hydrocarbon so as to form a porous polymer.

In one embodiment, the hydrocarbon is removed by evaporation or distillation.

In another embodiment, the hydrocarbon liquid is removed from a solidified form intended as a filter element by displacement with the liquid material being filtered.

Compositions containing as much as 95.5 weight percent liquid hydrocarbon and as little as about 4.5 weight percent of a particular polymer, such as polyethylene, having a high molecular weight and which is normally solid in character can be made to exhibit the physical appearance and physical state which is characteristic of the polymer alone. For example, in my copending application Serial No. 180,024 filed March 15, 1962, a solid briquet was prepared containing 4.5 weight percent of a high molecular weight ethylene polymer (molecular weight approximately 290,000) and about 95.5 weight percent of an isoparaffinic petroleum distillate boiling between about 420 and 475° F. The briquet was hard, non-sticky and could be handled as a solid and yet when burned released about 20,000 B.t.u. per pound. The briquet was most useful as an auxiliary ignition aid for the starting of charcoal fires.

It has now been discovered that the removal of substantially all of the liquid hydrocarbon produces a porous structure having utility as a filter or as other porous, low density objects.

Generally, the polymer-hydrocarbon composition will contain from about 4 to about 40 percent of solid polyolefin prior to removal of the liquid hydrocarbon, more preferably, from 5 to about 35 percent of solid polyolefin. The precise upper limit of the solid polyolefin in the mixture prior to removal of the liquid hydrocarbon depends upon the nature of the solid polyolefin as well as the specific characteristics of the liquid hydrocarbon chosen.

According to the invention, normally solid high molecular weight polymers that can be employed include polymers of 1-olefins having from 2 to 8 carbon atoms per molecule. The term "polymers of 1-olefin" include homopolymers of 1-olefins having from 2 to 8 carbon atoms and copolymers of these 1-olefins with each other. Representative examples of suitable 1-olefins include ethylene, propylene, butene-1, pentene-1, hexene-1, heptene-1, 4-methylpentene-1, 5-methylhexene-1, 4,4-dimethylhexene-1, 4-ethylhexene-1, octene-1 and the like. Suitable olefin polymers include variously polymerized ethylenes as well as polypropylene. The preferred polymers are ethylene polymers having a density ranging from 0.030 to 1.000, preferably 0.940 to 0.980 gm./cc. The term "ethylene polymers" includes homopolymers of ethylene as well as copolymers of ethylene with minor amounts of higher molecular weight monomers copolymerizable therewith such as propylene, 1-butene, 1-hexene, butadiene, isoprene, and the like. The still more preferred ethylene polymers are those having an average molecular weight greater than about 100,000 (as determined from viscosity).

The preferred ethylene polymers as described herein can be prepared according to the method described and claimed in Patent No. 2,825,721 to Hogan and Banks. However, the polymers applicable according to the invention can be prepared by any known method so long as the polymers have the above described properties. The ethylene polymers can be prepared by any of the known solution processes as well as the "particle-form" process (polymerization of 1-olefins carried out in suspension and below the temperature at which any substantial portion of the polymer formed is in solution in the suspending medium). The "particle-form" ethylene polymers ordinarily have an inherent viscosity ranging from 3–10 and a high load melt index (ASTM D–1238–57T—Procedure F) ranging from 0.6–20.0.

The intermediate solid polymer-hydrocarbon compositions can be prepared from normally liquid hydrocarbons or hydrocarbon mixtures or fuels which boil from about 100° F. to about 900° F. and higher. Hydrocarbons that can be employed include saturated and unsaturated acyclic, saturated and unsaturated cyclic, and aromatic hydrocarbons or combinations or mixtures thereof. Paraffinic materials including hexanes, octanes, decanes, pentadecanes and the like as well as mixtures of these materials are preferred. Petroleum refinery hydrocarbon fractions such as gasolines, kerosenes, stove oils, furnace oils, gas oils, cycle oils, diesel fuels, crude oils, topped crude, and the like may be used if desired. Hydrocarbon fractions having flash points ranging from atmos-

---

*Determined by plotting "softness" values vs. temperature. The temperature at which the slope of the resulting curve equals 0.035 softening units per ° F. is the softening point. "Softness" is determined by the method of Karrer, Davies and Dietrich, Industrial and Engineering Chemistry, Anal. Ed., 2, 96–99 (1930).

pheric to about 200° F. are usually preferred. As is well known by those skilled in the art, the flash point of materials flashing above about 175° F. is determined by the Cleveland Open Cup Method, ASTM D-92-57 and those flashing below 175° F. by the Tag Closed Cup Method, ASTM D-56-56. As indicated above, preferred hydrocarbons are those paraffins or largely paraffinic mixtures or isoparaffinic mixtures which boil between about 200° and about 700° F. Still more preferred are those that boil between about 300° and about 500° F. The preferred components or fractions are more convenient in that the preparation of the solid composition can be effected without the necessity for pressure vessels for the heating and blending step.

In the exercise of this present invention, the hydrocarbon and polymer are brought together in a common vessel and blended at a temperature which is sufficient to provide good mixing, preferably approximately 18–108° F. above the softening point of the polymer. If this temperature is above the atmospheric boiling point of the hydrocarbon, the operation is carried out in a pressurized vessel to maintain the liquid state. This blending operation is carried out until the contents of the vessel are completely homogeneous as indicated by its physical appearance. As little as two minutes may be sufficient or as long as 24 hours may be required depending on the temperature and properties of the components. In no case, however, should the time or temperature of heating be so excessive as to cause deterioration of the polymer or production of a product with an excessive impact penetration value hereinafter defined. Under mixing usually results in a product that phase separates upon cooling. The mixing should be conducted for a period of time and temperature such that the composition sets up into a solid product upon cooling to room temperature. Ordinarily, for ethylene polymers, a mixing temperature of 260–310° F. and mixing time of 5–15 minutes are satisfactory.

It is generally desirable to transfer the hot and still fluid product to another more convenient location before solidification begins where the desired shape of the finished product is obtained. Although a 5- to 100-mil film is generally preferred for the preparation of a filter, the composition may be solidified into other shapes, such as cubes, spheres, bars and the like which may be more suitable for other applications. Conventional forming techniques such as casting, injection molding, rolling, extrusion and the like may be used. The solidified objects may be sliced or cut into other shapes or sizes either before or after the hydrocarbon is removed.

When the product is solidified sufficiently, the hydrocarbon is removed. This may be carried out by simple evaporation whereby the composition is exposed to the atmosphere and substantially all of the hydrocarbon is removed. It is preferred, however, to accelerate the removal with the application of heat and/or a vacuum. The temperature during this stage must not exceed the softening point of the composition and in the case of the high density polyethylene should not exceed 250° F. Whatever combination of temperature and pressures are used, the condition should not be so extreme or sudden so as to rupture the structure of the composition or otherwise damage the delicate pores within.

It is also within the scope of the invention to add coloring material during the mixing step since unblended particles of polymer appear white and therefore, can be easily detected. This provides a convenient means for determining when homogeneous mixtures are obtained and may also provide a decorative effect.

Another feature of the invention is that the nature of the void producing agent, namely, the hydrocarbon, is such that its removal from the solid mass prior to its use as a filtering element is not necessary in many instances. The filtering element, frequently in the form of a flexible film, may be fixed into place while still containing the hydrocarbon and may immediately be used to filter an organic liquid such as gasoline, kerosene, solvents, and the like. The action of the filtration itself is sufficient to displace the hydrocarbon and permit the filter to function.

It has been found that less ethylene polymer is required than propylene polymer to obtain a solid product, and that less high molecular weight polyethylene is required than low molecular weight polyethylene. For example, a composition containing about 5 weight percent ethylene polymer having an average molecular weight of 290,000 is approximately equal to a composition containing about 15 weight percent polyethylene which has an average molecular weight of 90,000. Similarly, when using a low density polyethylene such as that prepared in the high pressure processes, more than 25 percent may be required to form the solidified material. Combinations of more than one type of polymer can be used. Small amounts of other solid hydrocarbon materials such as paraffin wax can also be added, if desired. The composition is also receptive to conventional oil soluble dyes and pigments for decorative effects or identification purposes.

Although the exact mechanism is not understood, it is not believed that there exists a true polymer solution during any significant portion of the preparation time of the porous object. Therefore, it is believed obvious that care should be exercised in the removal of the hydrocarbon diluent so as to prevent the collapse of the porous structure. It has also been observed that there is exhibited a small amount of shrinkage during the removal of the hydrocarbon diluent. This is particularly pronounced when there is a very high ratio of diluent to polymer. It has generally been found desirable to employ particle-form polymer in quantities not less than 15 weight percent polymer in the preparation of the composition prior to the evaporation of the diluent. Shrinkage may even be desired in instances where the size of the pores should be small.

The solid or rigid fuel compositions formed prior to evaporation of the diluent preferably have an impact penetration of less than about 60 percent, preferably less than about 50 percent and more preferably less than about 40 percent, as determined by dropping an impactor having a circular cross-section which is 0.500 inch in diameter and weighing 141.7 grams from a height of 10 inches above the surface of the hydrocarbon polymer composition. The specimen tested is in the form of a cylinder 1¼" in diameter by 0.580" thick. Furthermore, the rigid compositions have a compression value less than about 40 percent, preferably less than 30 percent, as determined by 10-minute, 7-pound weight test (static test) applied to a similar specimen.

A better understanding of the invention can be obtained by referring to the following illustrative example:

*Example*

A 400 ml. quantity of hydrocarbon diluent (1) was added to a sufficient quantity of particle-form polyethylene (2) in a 600 ml. beaker so that the mixture contained 7.5 weight percent polymer and 92.5 weight percent hydrocarbon. The beaker and contents were partially immersed in an oil bath maintained at 325° F. The mixture was stirred for about 20 minutes at which time it was converted to a viscous homogeneous liquid at a temperature of about 310° F. While still at that temperature, the beaker was removed from the bath and the bulk of the liquid was poured from the beaker leaving behind a film on the inside of the beaker which rapidly solidified as it cooled on exposure to the air. After the solidified film had cooled to room temperature it was easily peeled from the inside surface of the glass beaker. The material was flexible and the circular portion which was formed from the bottom of the beaker was about 30–50 mil thick. The film was then utilized as the filtering element in a Buchner funnel. Quantities of anhydrous methyl alcohol, acetone, isooctane, and n-heptane were then filtered through the film with the aid of vacuum. It was observed that the alcohol and acetone passed through the filter at a somewhat faster rate than the hydrocarbons, and the isooctane filtered faster than the n-heptane. The filtration rates through the 4 in. diameter film varied from about 0.5 to about 3 ml./min.

(1) A commercial isoparaffinic hydrocarbon fraction with a boiling range of 420–475° F. The aromatic content was nil and the specific gravity was about 0.775.

(2) A high molecular weight (about 290,000) polymer (3) with an inherent viscosity (4) of 4.76 and a melt index high load (5) of about 1.06. The polymer was in the form of a granular solid and was prepared in a low pressure polymerization process employing a chromium oxide containing catalyst.

(3) The molecular weights mentioned herein are weight average molecular weights and were calculated according to the equation $$M = \frac{4.03 \times 10^2 \times N_1 \times 14}{2.303} = 24,450 N_1$$

wherein M is the weight average molecular weight and $N_1$ is the inherent viscosity as determined from a solution of 0.01 gram of the polymer in 100 cc. of tetralin at 130° C. This type of molecular weight determination is described by Kemp and Peters, Ind. Eng. Chem. 35, 1108 (1943) and by Dienes and Klemm, J. Applied Phys., 17, 458 (June 1946).

(4) By the method of Kemp et al., Industrial and Engineering Chemistry, 35, 1108 (1943).

(5) Melt index as defined herein was determined by ASTM D–1238–52T with five runs being run at 2 minute intervals averaging the five weights discarding any values which deviate in the average by more than 5 weight percent, reaveraging and multiplying by five to obtain the amount of extrudate in ten minutes. If the melt index is low, such as less than 1.0, the high load melt index was obtained by ASTM D–1238–57T (Procedure F) using a weight of 21,600 grams.

While certain examples, structures, compositions and process steps have been described for purposes of illustration, the invention is not limited to these. Variation and modification within the scope of the disclosure and the claims can readily be effected by those skilled in the art.

I claim:

1. A porous polymeric object prepared by blending a normally solid polymer of a monoolefinic compound and a normally liquid hydrocarbon having a boiling point above the softening point of said polymer at a temperature above the softening point of said polymer but below the boiling point of said normally liquid hydrocarbon, cooling the resultant blend below the solidification point of said polymer and thereafter removing substantially all of said liquid hydrocarbon by evaporation so as to form a porous polymeric object.

2. A porous polymeric object suitable for use as a filter prepared by blending about 4 and 40 weight percent of a polymer of at least one mono-1-olefin having from 2 to 8 carbon atoms per molecule and between about 60 and about 96 weight percent of a normally liquid hydrocarbon boiling above the softening point of said polymer at a temperature above the softening point of said polymer but below the boiling point of said normally liquid hydrocarbon for a period of time such that an essentially clear pourable liquid is obtained, cooling the thus obtained liquid to obtain a solid composition having an impact penetration less than about 60 percent and thereafter removing substantially all of said liquid hydrocarbon by evaporation so as to form a porous polymeric object.

3. A porous solid polymeric object suitable for use as a filter prepared by blending together between about 5 to about 35 weight percent of a normally solid polymer selected from ethylene polymers and polypropylene and 95 to 65 weight percent of a normally liquid hydrocarbon boiling within the range of 300 to 900° F. at a temperature of from about 10 to about 60° C. above the melting point of the polymer but below the boiling point of said normally liquid hydrocarbon, working said blend at said temperature for a period of time from about 5 to about 20 minutes sufficient to form a uniform dispersion, which dispersion upon cooling forms a rigid composition having an impact penetration less than about 50 percent, cooling said dispersion below the softening point of said polymer, and removing substantially all of said normally liquid hydrocarbon by vaporizing said normally liquid hydrocarbon from said blend so as to produce a porous solid object suitable for use as the filter.

4. A method of preparing a porous polymeric object suitable for use as a filter comprising blending between about 4 to about 40 weight percent of a polymer of at least one 1-olefin having from 2 to 8 carbon atoms per molecule and between about 60 and about 96 weight percent of a normally liquid hydrocarbon boiling above about 100° F. at a temperature above the softening point of the polymer but below the boiling point of said normally liquid hydrocarbon and for a period of time such that an essentially clear pourable liquid is obtained, cooling said liquid to obtain a solid composition having an impact penetration less than about 60 percent and thereafter removing substantially all of said liquid hydrocarbon diluent by evaporation so as to form a porous polymeric object.

5. A method for preparing a porous polymeric object suitable for use as a filter comprising blending together between 5 to 35 weight percent of a normally solid polymer selected from ethylene polymers and polypropylene and 95 to 65 weight percent of a normally liquid hydrocarbon boiling within the range 300 to 900° F. at a temperature of from about 10 to about 60° C. above the softening point of the polymer but below the boiling pont of said normally liquid hydrocarbon and for a period of time in the range of about 5 to about 20 minutes and sufficient to form a uniform dispersion, which dispersion upon cooling forms a rigid composition having an impact penetration less than about 50 percent, cooling said dispersion below the solidification point of said polymer while containing said dispersion in a suitable form, and removing said hydrocarbon liquid from said composition by evaporation so as to form a porous polymeric object suitable for use as a filter.

6. A porous polymeric object prepared by blending a normally solid polymer of a monoolefinic compound and a normally liquid hydrocarbon having a boiling point above the softening point of said polymer at a temperature above the softening point of said polymer but below the boiling point of said normally liquid hydrocarbon, cooling the resultant blend below the solidification point of said polymer, and thereafter removing substantially all of said liquid hydrocarbon by displacement with a liquid material being filtered therethrough so as to form a porous polymeric object.

7. A porous polymeric object suitable for use as a filter prepared by blending between about 4 and about 40 weight percent of a polymer of at least one mono-1-olefin having from 2 to 8 carbon atoms per molecule and between about 60 and about 96 weight percent of a normally liquid hydrocarbon boiling above the softening point of said polymer but below the boiling point of said normally liquid hydrocarbon and for a period of time such that an essentially clear pourable liquid is obtained, cooling said thus obtained liquid to obtain a solid composition having an impact penetration less than about 60 percent, and thereafter removing substantially all of said liquid hydrocarbon by displacement with a liquid material being filtered therethrough so as to form a porous polymeric object.

8. A porous solid polymeric object suitable for use as a filter prepared by blending together between about 5 to about 35 weight percent of a normally solid polymer selected from ethylene polymers and polypropylene and 95 to 65 weight percent of a normally liquid hydrocarbon boiling within the range of 300 to 900° F. at a temperature of from about 10 to about 60° C. above the melting point of the polymer but below the boiling point of said normally liquid hydrocarbon, working said blend at said temperature at a period of time from about 5 to about 20 minutes sufficient to form a uniform dispersion, which dispersion upon cooling forms a rigid composition having an impact penetration less than about 50 percent, cooling said dispersion below the softening point of said polymer, and removing substantially all of said normally liquid hydrocarbon by displacement with a liquid material being filtered therethrough from said blend so as to produce a porous solid object suitable for use as the filter.

9. A method for preparing a porous polymeric object comprising blending a solid polymer of a monoolefinic compound and a volatile hydrocarbon liquid having boiling point above the softening point of said polymer at a temperature above the softening point of the polymer but below the boiling point of said volatile hydrocarbon liquid, cooling the resultant mixture below the solidification point of said polymer, and thereafter removing substantially all of said hydrocarbon by displacement with a liquid material so as to form a porous polymeric object.

10. A method of preparing a porous polymeric object suitable for use as a filter comprising blending between about 4 to about 40 weight percent of a polymer of at least one 1-olefin having from 2 to 8 carbon atoms per molecule and between about 60 and about 96 weight percent of a normally liquid hydrocarbon boiling above about 100° F. at a temperature above the softening point of the polymer but below the boiling point of said normally liquid hydrocarbon and for a period of time such that an essentially clear pourable liquid is obtained, cooling said liquid to obtain a solid composition having an impact penetration less than about 60 percent and thereafter removing substantially all of said liquid hydrocarbon diluent by displacement with a liquid material so as to form a porous polymeric object.

11. A method for preparing a porous polymeric object suitable for use as a filter comprising blending together between 5 to 35 weight percent of a normally solid polymer selected from ethylene polymers and polypropylene and 95 to 65 weight percent of a normally liquid hydrocarbon boiling within the range 300 to 900° F. at a temperature of from about 10 to about 60° C. above the softening point of the polymer but below the boiling point of said normally liquid hydrocarbon, and for a period of time in the range of about 5 to about 20 minutes and sufficient to form a uniform dispersion, which dispersion upon cooling forms a rigid composition having an impact penetration less than about 50 percent, cooling said dispersion below the solidification point of said polymer while containing said dispersion in a suitable form, and removing said hydrocarbon liquid from said composition by the application of a vacuum to said composition so as to form a porous polymeirc object suitable for use as a filter.

12. A method for preparing a porous polymeric object suitable for use as a filter comprising blending together between 5 to 35 weight percent of a normally solid polymer selected from ethylene polymers and polypropylene and 95 to 65 weight percent of a normally liquid hydrocarbon boiling within the range 300 to 900° F. at a temperature of from about 10 to about 60° C. above the softening point of the polymer but below the boiling point of said normally liquid hydrocarbon and for a period of time in the range of about 5 to about 20 minutes and sufficient to form a uniform dispersion, which dispersion upon cooling forms a rigid composition having an impact penetration less than about 50 percent, cooling said dispersion below the solidification point of said polymer while containing said dispersion in a suitable form, and removing said hydrocarbon liquid from said composition by displacement with a liquid material being filtered therethrough so as to form a porous polymeric object suitable for use as a filter.

13. The object of claim 8 wherein said polymer is a high molecular weight ethylene polymer having an inherent viscosity ranging from 3 to 10, a high load melt index ranging from 0.6 to 10 and is present in said composition in an amount ranging from 4.5 to 15 weight percent.

References Cited by the Examiner

UNITED STATES PATENTS

| | | | |
|---|---|---|---|
| 2,542,527 | 2/1951 | Honey et al. | 260—2.5 |
| 2,848,428 | 8/1958 | Rubens | 260—2.5 |
| 2,948,665 | 8/1960 | Rubens et al. | 260—2.5 |
| 2,981,979 | 5/1961 | Seefluth | 260—2.5 |

FOREIGN PATENTS

| | | |
|---|---|---|
| 224,200 | 9/1959 | Australia. |
| 610,577 | 12/1960 | Canada. |

MURRAY TILLMAN, *Primary Examiner.*

L. J. BERCOVITZ, *Examiner.*

M. FOELAK, *Assistant Examiner.*